(12) United States Patent
Beck

(10) Patent No.: US 7,376,135 B2
(45) Date of Patent: May 20, 2008

(54) MODEM SYSTEM AND AGGREGATOR FOR PATHS WITH DIFFERENT TRANSMISSION PROFILES

(75) Inventor: Michaël Andries Thomas Beck, Antwerp (BE)

(73) Assignee: Alcatel, Paris (FR)

( * ) Notice: Subject to any disclaimer, the term of this patent is extended or adjusted under 35 U.S.C. 154(b) by 1008 days.

(21) Appl. No.: 10/339,348

(22) Filed: Jan. 10, 2003

(65) Prior Publication Data
US 2003/0133456 A1 Jul. 17, 2003

(30) Foreign Application Priority Data
Jan. 11, 2002 (EP) .................................. 02290075

(51) Int. Cl.
*H04L 12/28* (2006.01)
*H04J 3/16* (2006.01)
(52) U.S. Cl. ........................................ 370/392; 370/465
(58) Field of Classification Search ........................ None
See application file for complete search history.

(56) References Cited

U.S. PATENT DOCUMENTS

| | | | | |
|---|---|---|---|---|
| 5,802,503 | A * | 9/1998 | Sansone ..................... | 705/401 |
| 5,892,754 | A * | 4/1999 | Kompella et al. ............ | 370/236 |
| 5,953,319 | A * | 9/1999 | Dutta et al. .................. | 370/238 |
| 6,014,431 | A   | 1/2000 | McHale et al. | |
| 6,081,517 | A * | 6/2000 | Liu et al. ..................... | 370/352 |
| 6,594,268 | B1* | 7/2003 | Aukia et al. ................. | 370/400 |
| 6,639,898 | B1* | 10/2003 | Dutta et al. .................. | 370/238 |
| 6,687,229 | B1* | 2/2004 | Kataria et al. .............. | 370/238 |
| 6,785,263 | B1* | 8/2004 | Morinaga et al. ........... | 370/352 |
| 6,842,429 | B1* | 1/2005 | Shridhar et al. ............ | 370/252 |
| 7,031,311 | B2* | 4/2006 | MeLampy et al. .......... | 370/392 |
| 7,130,264 | B2* | 10/2006 | Wiebe et al. ............... | 370/225 |
| 7,187,712 | B2* | 3/2007 | Chow et al. ................. | 375/222 |
| 2001/0019554 | A1* | 9/2001 | Nomura et al. ............. | 370/389 |
| 2002/0010792 | A1* | 1/2002 | Border et al. ............... | 709/238 |

(Continued)

FOREIGN PATENT DOCUMENTS

EP 0893934 A1 1/1999

OTHER PUBLICATIONS

CSMA/CD, IEEE Std 802.3, 2000 Edition, 43. Link Aggregation, pp. 1215-1278.

*Primary Examiner*—Andrew C. Lee
(74) *Attorney, Agent, or Firm*—Sughrue Mion, PLLC

(57) ABSTRACT

Different services like video-on-demand and Internet Protocol telephony require different paths with different transmission profiles. Known modem systems (1) and aggregators (7) select paths by detecting additional information in packet signals, like in Ethernet the so-called Virtual Local Area Network (VLAN) tags, and in Asynchronous Transfer Mode (ATM) so-called (virtual) path identifiers. This disadvantageous additional information can be avoided by detecting (71) a source/destination address and, in response to said detecting, selecting (72) a transmission profile and, in dependence of said selecting, supplying (70) said packet signal to a path defined by said selected transmission profile. Solely the source/destination address, like a source address and/or a destination address, being Ethernet addresses, Internet Protocol addresses or even port addresses, allow said selecting, which is more efficient. Preferably a first path is an interleaved path for video-on-demand with a lower bit error rate, with a second path being a non-interleaved path with a lower delay for Internet Protocol telephony.

9 Claims, 1 Drawing Sheet

U.S. PATENT DOCUMENTS

Figure 1:
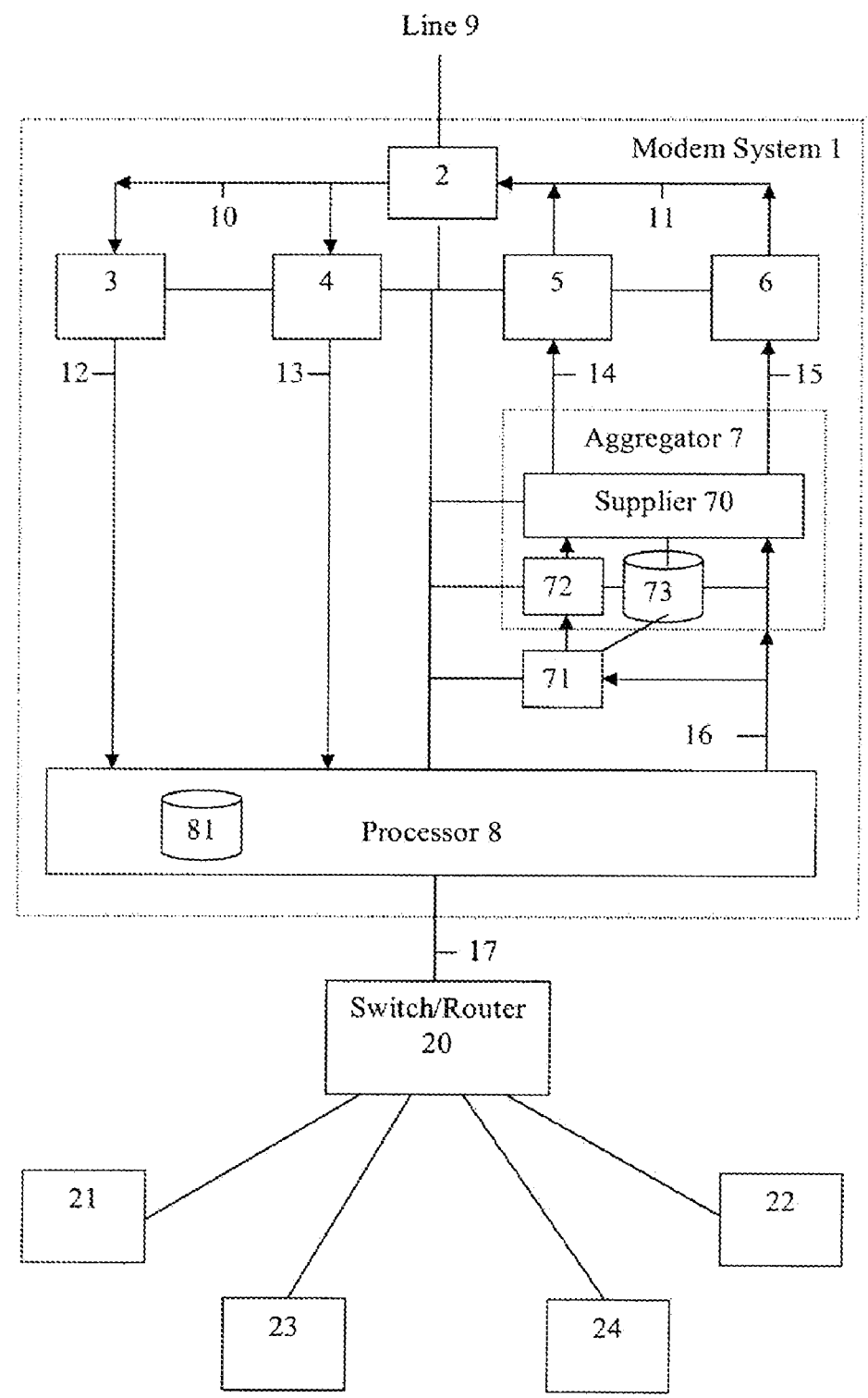

2002/0122429 A1* 9/2002 Griggs ................. 370/401
2002/0141345 A1* 10/2002 Szviatovszki et al. ...... 370/238
2003/0053463 A1* 3/2003 Vikberg et al. .......... 370/395.1
2003/0103465 A1* 6/2003 Counterman ............... 370/252

* cited by examiner

MODEM SYSTEM AND AGGREGATOR FOR PATHS WITH DIFFERENT TRANSMISSION PROFILES

The invention relates to a modem system, comprising at least a first interface coupled to a first path defined by a first transmission profile and at least a second interface coupled to a second path defined by a second transmission profile, for exchanging packet signals, with said first and second transmission profiles being different from each other.

The invention also relates to a network comprising a modem system comprising at least a first interface coupled to a first path defined by a first transmission profile and at least a second interface coupled to a second path defined by a second transmission profile, for exchanging packet signals, with said first and second transmission profiles being different from each other, and to an aggregator for use in a network comprising a modem system comprising at least a first interface coupled to a first path defined by a first transmission profile and at least a second interface coupled to a second path defined by a second transmission profile, for exchanging packet signals, with said first and second transmission profiles being different from each other, and to a processor program product for use in a network comprising a modem system comprising at least a first interface coupled to a first path defined by a first transmission profile and at least a second interface coupled to a second path defined by a second transmission profile, for exchanging packet signals, with said first and second transmission profiles being different from each other, and to a method for use in a network comprising a modem system comprising at least a first interface coupled to a first path defined by a first transmission profile and at least a second interface coupled to a second path defined by a second transmission profile, for exchanging packet signals, with said first and second transmission profiles being different from each other.

Such a modem system is generally known, from for example an Ethernet environment or an Asynchronous Transfer Mode (ATM) environment, with paths for example being multiplexed via a single physical Digital Subscriber Line (DSL).

To be able to select an interface and a corresponding path and transmission profile, in the Ethernet environment so-called Virtual Local Area Network or VLAN tagging has been introduced, and in the ATM environment so-called (virtual) path identifiers have been introduced. For both cases, additional information is added to the packet signal to be able to select the interface, path and transmission profile.

The known modem system is disadvantageous, inter alia, due to requiring said additional information being added to the packet signal. This additional information reduces the efficiency/capacity of a packet signal, and must additionally be generated and detected.

It is an object of the invention, inter alia, of providing a modem system as defined in the preamble which allows an interface with a corresponding path and transmission profile being selected without requiring additional information to be added to the packet signal.

The modem system according to the invention is characterised in that said modem system comprises a detector for detecting a source/destination address in a packet signal, which detector is coupled to an aggregator comprising a selector for, in response to said detecting, selecting a transmission profile and comprising a supplier for, in dependence of said selecting, supplying said packet signal to an interface coupled to a path defined by said selected transmission profile.

By using the detector for detecting the source/destination address (an address of a source and/or of a destination) in a packet signal, the aggregator selects, in response to said detecting, a transmission profile (like for example low bit rate or high bit rate) and supplies, in dependence of said selecting, said packet signal to the interface coupled to the path defined by said selected transmission profile.

The invention is based upon an insight, inter alia, that the source and/or the destination of a packet signal may give a good indication about the transmission profile needed for this packet signal, and is based upon a basic idea, inter alia, that packet signals always contain source/destination addresses which are used for routing and which can further be used for selecting transmission profiles.

The invention solves the problem, inter alia, of providing a modem system as defined in the preamble which no longer requires additional information to be able to select transmission profiles.

It should be noted that link aggregation itself is known from Ethernet, IEEE 802.3 clause 43. This clause defines the use of several identical data links as a single Ethernet pipe. An aggregator separates frames in different conversations, which are forwarded to predefined associated links. A conversation is defined as a set of Media Access Control Layer or MAC frames which share the same combination of source address and destination address. The aggregator selects one of the data links for each conversation, for example based upon the load of a link. So, aggregators selecting for load balancing purposes are known. Aggregators according to the invention selecting for transmission profile purposes solely by using source/destination information without requiring/using additional information are not known, and allow, inter alia, the creation of advantageous (efficient) modem systems.

A first embodiment of the modem system according to the invention as defined in claim 2 is advantageous in that said source/destination address comprises at least a source address and/or a destination address. The source address and/or the destination address each for example define an access concentrator, an Internet Protocol (IP) phone, a video-on-demand set-top-box and/or a personal computer. In case of either a source address or a destination address being used for said selecting, at most the number of source or destination addresses can indicate at most the same number of different transmission profiles. In case of a source address as well as a destination address being used for said selecting, at most the number of source addresses multiplied with the number of destination addresses can indicate at most the possible different transmission profiles.

A second embodiment of the modem system according to the invention as defined in claim 3 is advantageous in that said source/destination address comprises at least one Ethernet address. In case of MAC1 defining the access concentrator, MAC2 defining the IP phone, MAC3 defining the video-on-demand set-top-box and MAC4 defining the personal computer, for example in response to detection of source address MAC1 and destination address MAC3, a path with a transmission profile suitable for video-on-demand will be selected, and for example in response to detection of source address MAC1 and destination address MAC2, a path with a transmission profile suitable for voice-over-IP will be selected.

A third embodiment of the modem system according to the invention as defined in claim 4 is advantageous in that said source/destination address comprises at least one Internet Protocol address. Especially in case of a LAN being coupled to said IP phone, video-on-demand set-top-box and personal computer, with said modem being coupled to said LAN via a switch/router which replaces Ethernet information, the original Ethernet addresses in the IEEE 802.3 layer can no longer be detected in said modem, which then could use the IP addresses in the higher (IP) layer for said detecting and selecting.

A fourth embodiment of the modem system according to the invention as defined in claim 5 is advantageous in that said source/destination address comprises at least one port address, with a port being for example a TCP port or a UDP port. Especially in case of said IP addresses being all equal or being undetectable, the port addresses (including codes defining different windows) could be used for said detecting and selecting.

A fifth embodiment of the modem system according to the invention as defined in claim 6 is advantageous in that said first path is a slowlier path with a lower bit error rate than said second path, with said second path being a faster path with a lower delay than said first path. For example video-on-demand requires a low bit error rate to be realised via for example interleavers in interfaces at both sides of a transmission path which however cause large latencies (delays). Contrary to this, for example IP telephony requires a low latency (delay) to be realised via for example interfaces not comprising any interleavers as a result of which the bit error rate however will increase.

Embodiments of the network according to the invention, of the aggregator according to the invention, of the processor program product according to the invention and of the method according to the invention correspond with the embodiments of the modem according to the invention.

These and other aspects of the invention will be apparent from and elucidated with reference to the embodiments(s) described hereinafter.

FIG. 1 illustrates in block diagram form a modem system according to the invention comprising an aggregator according to the invention and forming part of a network according to the invention.

FIG. 1 illustrates a modem system 1 according to the invention comprising a fork 2 of which an in/output is coupled to a line 9 and of which an output is coupled via a connection 10 to an input of an interface 3 and to an input of an interface 4 and of which fork 2 an input is coupled via a connection 11 to an output of an interface 5 and to an output of an interface 6. A control in/output of fork 2 is coupled via a control connection to a processor 8, which control connection is further coupled to control in/outputs of said interfaces 3-6. An output of interface 3 is coupled via a connection 12 to an input of processor 8, and an output of interface 4 is coupled via a connection 13 to an input of processor 8. An output of processor 8 is coupled via a connection 16 to an input of an aggregator 7, of which a first output is coupled via a connection 14 to an input of interface 5 and of which a second output is coupled via a connection 15 to an input of interface 6. Modem system 1 further comprises a detector 71 comprising an input coupled to said connection 16. Aggregator 7 comprises a selector 72 of which an input is coupled to an output of detector 71. An output of selector 72 is coupled to a first input of a supplier 70, of which supplier 70 a second input is coupled to the input of aggregator 7. A first output of supplier 70 is coupled to connection 14, and a second output of supplier 70 is coupled to connection 15. Aggregator 7 further comprises a memory 73 coupled to said input of aggregator 7 and to supplier 70, detector 71 and selector 72. Processor 8 comprises a memory 81 and an in/output coupled via a connection 17 to a switch/router 20, which switch/router is further coupled for example via an Ethernet environment to terminals 21-24. Via said control connection, processor 8 is further coupled to control in/outputs of supplier 70, detector 71 and selector 72.

Line 9 for example comprises at least two paths, a first path defined by a first transmission profile (for example low bit rate) and a second path defined by a second transmission profile (for example high bit rate). Interfaces 3 and 5 interface data (to be) exchanged via said first path (for example by (de)interleaving), and interfaces 4 and 6 interface data (to be) exchanged by said second path (for example by not (de)interleaving).

Either modem system 1 together with line 9 and possibly together with connection 17 and switch/router 20 form a network according to the invention, or modem system 1 together with connection 17, switch/router 20 and possibly at least the connections with terminals 21-24 form a network according to the invention.

Prior art modem systems are generally known, from for example an Ethernet environment or an Asynchronous Transfer Mode (ATM) environment. To be able to select (in the transmitting case) either interface 5 and the corresponding first path and first transmission profile or interface 6 and the corresponding second path and second transmission profile, in the Ethernet environment so-called Virtual Local Area Network or VLAN tagging has been introduced, and in the ATM environment so-called (virtual) path identifiers have been introduced. For both cases, additional information is added to the packet signal to be able to select the interface, path and transmission profile.

These prior art modem systems are disadvantageous, inter alia, due to requiring said additional information being added to the packet signal. This additional information reduces the efficiency/capacity of a packet signal, and must additionally be generated and detected.

According to the invention, modem system 1 comprises a detector 71 for detecting a source/destination address in a packet signal and comprises an aggregator 7 comprising a selector 72 for, in response to said detecting, selecting a transmission profile and comprising a supplier 70 for, in dependence of said selecting, supplying said packet signal to an interface 5 or 6 coupled to a first or second path defined by said selected first or second transmission profile.

By using the detector 71 for detecting the source/destination address (an address of a source and/or of a destination) in a packet signal and by using said selector 72 for, in response to said detecting, selecting a transmission profile (like for example low bit rate or high bit rate), supplier 70 can supply said packet signal to the interface 5 or 6 coupled to the first or second path defined by said selected first or second transmission profile. Thereto, at the arrival of a packet signal via connection 16, detector 71 detects the source/destination address (an address of a source and/or of a destination) and informs selector 72 which, for example via consulting memory 73, finds out which path is to be used for this packet signal, and which selector 72 informs supplier 70 correspondingly with selection information. Supplier 70, having received the entire packet signal via connection 16 and the input of aggregator 7, supplies this entire packet signal, in response to said selection information, to interface 5 or 6.

It should be noted that link aggregation itself is known from Ethernet, IEEE 802.3 clause 43. This clause defines the use of several identical data links as a single Ethernet pipe. An aggregator separates frames in different conversations, which are forwarded to predefined associated links. A conversation is defined as a set of Media Access Control Layer or MAC frames which share the same combination of source address and destination address. The aggregator selects one of the data links for each conversation, for example based upon the load of a link. So, aggregators selecting for load balancing purposes are known. Aggregators according to the invention selecting for transmission profile purposes solely by using source/destination information without requiring/ using additional information are not known, and allow, inter alia, the creation of advantageous (efficient) modem systems.

According to a first embodiment, said source/destination address comprises at least a source address and/or a destination address. The source address and/or the destination address each for example define an access concentrator not shown and connected to line 9, an Internet Protocol (IP) phone like for example terminal 21, a video-on-demand set-top-box like for example terminal 22 and/or a personal computer like for example terminal 23. In case of either a source address or a destination address being used for said selecting, at most the number of source or destination addresses can indicate at most the same number of different transmission profiles. In case of a source address as well as a destination address being used for said selecting, at most the number of source addresses multiplied with the number of destination addresses can indicate at most the possible different transmission profiles.

According to a second embodiment, said source/destination address comprises at least one Ethernet address. In case of MAC1 defining the access concentrator, MAC2 defining the IP phone like for example terminal 21, MAC3 defining the video-on-demand set-top-box like for example terminal 22 and MAC4 defining the personal computer like for example terminal 23, for example in response to detection of source address MAC1 and destination address MAC3, a path with a transmission profile suitable for video-on-demand will be selected, as a result of which said packet signal is supplied by supplier 70 to interface 5, and for example in response to detection of source address MAC1 and destination address MAC2, a path with a transmission profile suitable for voice-over-IP will be selected, as a result of which said packet signal is supplied by supplier 70 to interface 6.

According to a third embodiment, said source/destination address comprises at least one Internet Protocol address. Especially in case of a LAN being coupled to said IP phone like for example terminal 21, video-on-demand set-top-box like for example terminal 22 and personal computer like for example terminal 23, with said modem system 1 being coupled to said LAN via switch/router 20 which replaces Ethernet information, the original Ethernet addresses in the IEEE 802.3 layer can no longer be detected in said modem 1, which then will use the IP addresses in the higher (IP) layer for said detecting and selecting by detector 71 and selector 72.

According to a fourth embodiment, said source/destination address comprises at least one port address, with a port being for example a TCP port or a UDP port. Especially in case of said IP addresses being all equal or being undetectable, the port addresses (including codes defining different windows) could be used for said detecting and selecting by detector 71 and selector 72.

According to a fifth embodiment, said first path is a slowlier path with a lower bit error rate than said second path, with said second path being a faster path with a lower delay than said first path. For example video-on-demand requires a low bit error rate to be realised via for example an interleaver in interface 5 and in the interface at the other side of the transmission path which however cause large latencies (delays). Contrary to this, for example IP telephony requires a low latency (delay) to be realised via for example an interface 6 not comprising any interleaver as a result of which the bit error rate however will increase.

It is an object of the invention, inter alia, of providing a modem system 1 which allows an interface 5,6 with a corresponding path and transmission profile being selected without requiring additional information to be added to the packet signal. Thereto, said modem system 1 comprises said detector 71 for detecting a source/destination address in a packet signal and comprises aggregator 7 comprising selector 72 for, in response to said detecting, selecting a transmission profile, and comprising supplier 70 for, in dependence of said selecting, supplying said packet signal to an interface 5,6 coupled to a path defined by said selected transmission profile. Alternatively, said modem system 1 may comprise detector 71 and selector 72 for detecting a source/destination address in a packet signal and for, in response to said detecting, selecting a transmission profile, and may comprise another aggregator comprising supplier 70 for, in dependence of said selecting, supplying said packet signal to an interface 5,6 coupled to a path defined by said selected transmission profile. Further alternatively, said modem system 1 may comprise another aggregator comprising detector 71 for detecting a source/destination address in a packet signal and comprising selector 72 for, in response to said detecting, selecting a transmission profile and comprising supplier 70 for, in dependence of said selecting, supplying said packet signal to an interface 5,6 coupled to a path defined by said selected transmission profile.

The invention is based upon an insight, inter alia, that the source and/or the destination of a packet signal may give a good indication about the transmission profile needed for this packet signal, and is based upon a basic idea, inter alia, that packet signals always contain source/destination addresses which are used for routing and which can further be used for selecting transmission profiles. The invention solves the problem, inter alia, of providing a modem system 1 which no longer requires additional information to be able to select transmission profiles.

It is a further object of the invention, inter alia, of providing an aggregator 7 for use in combination with for example one or more modems, which aggregator 7 allows an interface 5,6 with a corresponding path and transmission profile being selected without requiring additional information to be added to the packet signal. Thereto, said aggregator 7 comprises selector 72 for, in response to said detecting by detector 71, selecting a transmission profile, and comprises supplier 70 for, in dependence of said selecting, supplying said packet signal to an interface 5,6 coupled to a path defined by said selected transmission profile. Alternatively, for example said modem system 1 may comprise detector 71 for detecting a source/destination address in a packet signal and may comprise selector 72 for, in response to said detecting, selecting a transmission profile, with said aggregator 7 comprising supplier 70 for, in dependence of said selecting, supplying said packet signal to an interface 5,6 coupled to a path defined by said selected transmission profile. Further alternatively, aggregator 7 may comprise detector 71 for detecting a source/destination address in a packet signal and may comprise selector 72 for, in response to said detecting, selecting a transmission profile and may comprise supplier 70 for, in dependence of said selecting, supplying said packet signal to an interface 5,6 coupled to a path defined by said selected transmission profile.

It is a yet further object of the invention, inter alia, of providing a network, which either comprises modem system 1 together with line 9 and possibly together with connection 17 and switch/router 20, or comprises modem system 1 together with connection 17, switch/router 20 and possibly at least the connections with terminals 21-24. Thereto, said modem system 1 comprises detector 71 for detecting a source/destination address in a packet signal and comprises aggregator 7 comprising selector 72 for, in response to said detecting, selecting a transmission profile and comprising supplier 70 for, in dependence of said selecting, supplying said packet signal to an interface 5,6 coupled to a path defined by said selected transmission profile. Alternatively, said modem system 1 may comprise detector 71 for detecting a source/destination address in a packet signal and may comprise selector 72 for, in response to said detecting, selecting a transmission profile, and may comprise another aggregator comprising supplier 70 for, in dependence of said selecting, supplying said packet signal to an interface 5,6 coupled to a path defined by said selected transmission profile. Further alternatively, said aggregator 7 may comprise detector 71 for detecting a source/destination address in a packet signal and may comprise selector 72 for, in response to said detecting, selecting a transmission profile and may comprise supplier 70 for, in dependence of said selecting, supplying said packet signal to an interface 5,6 coupled to a path defined by said selected transmission profile.

It is also an object of the invention, inter alia, of providing a processor program product for use in a network comprising a modem system comprising at least a first interface coupled to a first path defined by a first transmission profile and at least a second interface coupled to a second path defined by a second transmission profile, for exchanging packet signals, with said first and second transmission profiles being different from each other. Thereto, said network comprises a detector for detecting a source/destination address in a packet signal, with the processor program product comprising an aggregation function comprising a selection function for, in response to said detecting, selecting a transmission profile and comprising a supply function for, in dependence of said selecting, supplying said packet signal to an interface coupled to a path defined by said selected transmission profile. Of course, said processor program product may further comprise a detection function for detecting a source/destination address in a packet signal.

And it is an object of the invention, inter alia, of providing a method for use in a network comprising a modem system comprising at least a first interface coupled to a first path defined by a first transmission profile and at least a second interface coupled to a second path defined by a second transmission profile, for exchanging packet signals, with said first and second transmission profiles being different from each other. Thereto, said network comprises a detector for detecting a source/destination address in a packet signal, with said method comprising the steps of, in response to said detecting, selecting a transmission profile and of, in dependence of said selecting, supplying said packet signal to an interface coupled to a path defined by said selected transmission profile. Of course, said method may further comprise the step of detecting a source/destination address in a packet signal.

In FIG. 1, modem system 1 comprises interfaces 5 and 6 and aggregator 7, with aggregator 7 comprising supplier 70 and selector 72, with interfaces 5 and 6 (together with interfaces 3 and 4 and with fork 2) for example corresponding with one modem. According to an alternative situation, modem system 1 may comprise interfaces 5 and 6 and aggregator 7, with aggregator 7 comprising supplier 70 and selector 72, with interface 5 (together with interface 3 and with fork 2) for example corresponding with a first modem, and with interface 6 (together with interface 4 and with another fork not shown) for example corresponding with a second modem. For both situations, as described before, aggregator 7 may comprise supplier 70 and controller 72 and detector 71 now also forming part of aggregator 7. Or, for both situations, alternatively, aggregator 7 may comprise supplier 70, with detector 71 and selector 72 now not forming part of aggregator 7.

In FIG. 1, both said first and second path flow via the same line 9, thereby usually using different frequency bands, different time slots, different wave lengths etc. According to alternative situations, further (third etc.) paths may flow via this same line 9, and certain paths may flow via different lines having the same destination or having different (intermediate) destinations. Line 9 comprises a copper wire, an optical conductor etc. and may further comprise cordless, wireless and/or mobile parts. However, whatever situation is chosen, at least two paths are defined by different transmission profiles, with one of these different transmission profiles being selected in response to a detection of a source/destination address in a packet signal.

In case of fork 2 being located between interfaces 3-6 on the one hand and line 9 on the other hand, fork 2, usually under control of processor 8, will manage the combining of packet signals arriving from interfaces 5, 6 and their transmission, and will manage the receival of packet signals arriving via line 9 and via different paths. Thereto, fork 2 then for example comprises one or more (de)multiplexers. Alternatively and/or in addition, for each different path a different fork may be used, possibly in combination with one or more (de)multiplexers. But other solutions than forks are not to be excluded, like for example duplexers, switches etc.

Each block shown or not shown, can be 100% hardware, 100% software or a mixture of both. Each block shown or not shown can be integrated with each other block shown and/or not shown. Especially processor 8 and aggregator 7 (and detector 71 if not already forming part of aggregator 7) will generally be integrated with each other due to aggregator 7 (and detector 71 if not already forming part of aggregator 7) comprising a lot of digital signal processing technology (for example said detecting of Ethernet addresses, IP addresses and port addresses respectively is done in the IEEE802.3 layer, the IP layer and the TCP layer respectively). Said interfaces 3-6 are generally located inside modem system 1, before or after fork 2, and may each comprise their own processor and/or memory, buffer etc. and may correspond with and/or form part of one or more modems. Aggregator 7 may comprise its own processor and/or memory, buffer etc., and memories 73 and 81 may be integrated. Supplier 70, detector 71 and selector 72 may each comprise their own processor/memory, buffer etc. Switch/router 20 may replace Ethernet information and may comprise its own processor/memory, buffer etc.

The invention claimed is:

1. A modem system, comprising:
    at least a first interface coupled to a first path defined by a first transmission profile and at least a second interface coupled to a second path defined by a second transmission profile, and configured to exchange packet signals,
    wherein said first transmission profile is different from said second transmission profile, wherein said modem system comprises a detector which detects at least one of a source address and a destination address in a packet signal, wherein the detector is coupled to an aggregator comprising a selector which, in response to said detection, selects a transmission profile from the first transmission profile and the second transmission profile, and comprising a supplier which, based on said selected transmission profile, supplies said packet signal to an interface of the first interface and the second interface coupled to a path defined by said selected transmission profile; and said selector selects said transmission profile based solely on said detected at least one of a source address and a destination address.

2. The modem system according to claim 1, wherein at least one of said source address and said destination address comprises at least one Ethernet address.

3. The modem system according to claim 1, wherein at least one of said source address and said destination address comprises at least one Internet Protocol address.

4. The modem system according to claim 1, wherein at least one of said source address and said destination address comprises at least one port address.

5. The modem system according to claim 1, wherein said first path is a slower path with a lower bit error rate than said second path, wherein said second path is a faster path with a lower delay than said first path.

6. A network comprising a modem system, the modem system comprising at least a first interface coupled to a first path defined by a first transmission profile and at least a second interface coupled to a second path defined by a second transmission profile, which are configured to exchange packet signals, wherein:

said first transmission profile is different from said second transmission profile;

said network further comprising a detector which detects at least one of a source address and a destination address in a packet signal;

said detector is coupled to an aggregator comprising a selector which, in response to said detection, selects a transmission profile of the first transmission profile and the second transmission profile;

said selector comprises a supplier which, based on said selected transmission profile, supplies said packet signal to an interface of said first interface and said second interface coupled to a path defined by said selected transmission profile; and wherein said selector selects said transmission profile based solely on said detected at least one of a source address and a destination address.

7. An aggregator for use in a network, the network comprising a modem system comprising at least a first interface coupled to a first path defined by a first transmission profile and at least a second interface coupled to a second path defined by a second transmission profile, which exchanges packet signals, wherein said first transmission profile is different from said second transmission profile, wherein said network comprises a detector for detecting a source/destination address in a packet signal, which detector is coupled to said aggregator, said aggregator comprising:

a selector which, in response to said detecting, selects a transmission profile and comprising a supplier for, in dependence of said selecting, supplies said packet signal to an interface coupled to a path defined by said selected transmission profile; and wherein said selector selects said transmission profile based solely on said detected at least one of a source address and a destination address.

8. A computer program embodied on a computer readable recording medium for enabling a computer to control a network comprising a modem system comprising at least a first interface coupled to a first path defined by a first transmission profile and at least a second interface coupled to a second path defined by a second transmission profile, which exchanges packet signals, wherein said first transmission profile is different from said second transmission profile, wherein said network comprises a detector which detects at least one of a source address and a destination address in a packet signal, wherein the computer program comprises software instructions stored on the computer readable recording medium, the instructions comprising:

an aggregation function comprising a selection function which, in response to said detection, selects a transmission profile of the first transmission profile and the second transmission profile, and a supply function which, in dependence of said selection, supplies said packet signal to an interface of said first interface and said second interface coupled to a path defined by said selected transmission profile; and wherein said selector function selects said transmission profile based solely on said detected at least one of a source address and a destination address.

9. Method for use in a network comprising a modem system comprising at least a first interface coupled to a first path defined by a first transmission profile and at least a second interface coupled to a second path defined by a second transmission profile, which exchanges, wherein said first transmission profile is different from second transmission profile, wherein said network comprises a detector for detecting at least one of a source address and a destination address in a packet signal, wherein the method comprises:

in response to said detecting, selecting a transmission profile and based on said selecting, supplying said packet signal to an interface coupled to a path defined by said selected transmission profile; and wherein said selecting of said transmission profile is based solely on said detected at least one of a source address and a destination address.

* * * * *